US012689082B2

(12) United States Patent
Ichikawa et al.

(10) Patent No.: US 12,689,082 B2
(45) Date of Patent: Jul. 21, 2026

(54) POWER SUPPLY DEVICE

(71) Applicant: Yazaki Corporation, Tokyo (JP)

(72) Inventors: Hidehiro Ichikawa, Shizuoka (JP);
Ayako Okazaki, Shizuoka (JP)

(73) Assignee: YAZAKI CORPORATION, Tokyo
(JP)

( * ) Notice: Subject to any disclaimer, the term of this
patent is extended or adjusted under 35
U.S.C. 154(b) by 642 days.

(21) Appl. No.: 18/310,799

(22) Filed: May 2, 2023

(65) Prior Publication Data

US 2023/0369695 A1 Nov. 16, 2023

(30) Foreign Application Priority Data

May 11, 2022 (JP) ................................. 2022-078102

(51) Int. Cl.
*H01M 50/204* (2021.01)
*H01M 50/507* (2021.01)
(52) U.S. Cl.
CPC ....... *H01M 50/204* (2021.01); *H01M 50/507*
(2021.01)
(58) Field of Classification Search
None
See application file for complete search history.

(56) References Cited

U.S. PATENT DOCUMENTS

2011/0064986 A1* 3/2011 Ogasawara ......... H01M 50/507
174/68.2

FOREIGN PATENT DOCUMENTS

JP 2015133223 A * 7/2015
JP 2017-216802 A 12/2017

OTHER PUBLICATIONS

JP 2015-133223-A Machine Translation (Year: 2015).*

* cited by examiner

*Primary Examiner* — Jeffrey T Barton
(74) *Attorney, Agent, or Firm* — Sughrue Mion, PLLC

(57) ABSTRACT

A power supply device includes: a battery cell assembly
including battery cells; and a bus bar module mounted to the
battery cell assembly. The bus bar module includes a bus bar,
an electric wire, and an electric wire wiring body. The
electric wire wiring body includes: a bus bar chamber
configured to accommodate the bus bar therein; an electric
wire wiring portion having a first side opened and a second
side closed, the electric wire wiring portion configured to
accommodate the electric wire therein; and a lid arranged at
an opening of the electric wire wiring portion. The lid has an
opening portion through which the electric wire accommo-
dated in the electric wire wiring portion is visible. The bus
bar module is mounted to the battery cell assembly with the
lid facing the battery cell assembly.

5 Claims, 6 Drawing Sheets

FIG. 1

POWER SUPPLY DEVICE

CROSS-REFERENCE TO RELATED APPLICATIONS

The present application is based on and claims the benefit of priority from the prior Japanese Patent Application No. 2022-078102, filed on May 11, 2022, the entire contents of which are incorporated by reference herein.

TECHNICAL FIELD

The disclosure relates to a power supply device.

BACKGROUND

JP 2017-216802 A describes a power supply device including a battery cell assembly having a plurality of battery cells and a bus bar module mounted to the battery cell assembly. In this power supply device, the bus bar module includes a bus bar electrically connected to the electrode of the battery cell, an electric wire electrically connected to the bus bar, and an electric wire wiring body arranged on the electrode side of the battery cell with respect to the battery cell assembly. The electric wire wiring body includes an accommodating frame portion as a bus bar chamber which accommodates a bus bar therein, an electric wire wiring passage portion as an electric wire wiring portion which has one side closed and the other side opened and accommodates the electric wire therein, and an electric wire lid as a lid which closes an opening of the electric wire wiring passage portion.

In the power supply device described above, a plurality of ribs is provided in the electric wire wiring passage portion in order to prevent the electric wire from being caught when the opening of the electric wire wiring passage portion is closed by the electric wire lid. The electric wire lid is provided with a plurality of through holes in which the plurality of ribs is respectively accommodated when the opening of the electric wire wiring passage portion is closed by the electric wire lid. In a state where the rib is accommodated in the through hole, a gap is formed. The gap is used to visually recognize the wiring state of the electric wire with respect to the electric wire wiring passage portion in a state before the bus bar module is mounted to the battery cell assembly.

SUMMARY OF THE INVENTION

In the power supply device described above, the gap of the lid is small, and it is difficult to visually recognize the wiring state of the electric wire with respect to the electric wire wiring portion. Therefore, in order to make it easy to visually recognize the wiring state of the electric wire, it is conceivable to provide an opening portion that increases the gap of the lid. However, when a large opening portion is provided in the lid, there is a high possibility that the electric wire interferes with a peripheral member.

The disclosure is directed to a power supply device capable of visually recognizing a wiring state of an electric wire with respect to an electric wire wiring portion and protecting the electric wire.

A power supply device in accordance with some embodiment includes: a battery cell assembly including battery cells; and a bus bar module mounted to the battery cell assembly. The bus bar module includes a bus bar, an electric wire, and an electric wire wiring body. The electric wire wiring body includes: a bus bar chamber configured to accommodate the bus bar therein; an electric wire wiring portion having a first side opened and a second side closed, the electric wire wiring portion configured to accommodate the electric wire therein; and a lid arranged at an opening of the electric wire wiring portion. The lid has an opening portion through which the electric wire accommodated in the electric wire wiring portion is visible. The bus bar module is mounted to the battery cell assembly with the lid facing the battery cell assembly.

According to the above configuration, it is possible to provide the power supply device capable of visually recognizing the wiring state of the electric wire with respect to the electric wire wiring portion and protecting the electric wire.

BRIEF DESCRIPTION OF DRAWINGS

Figure 1:
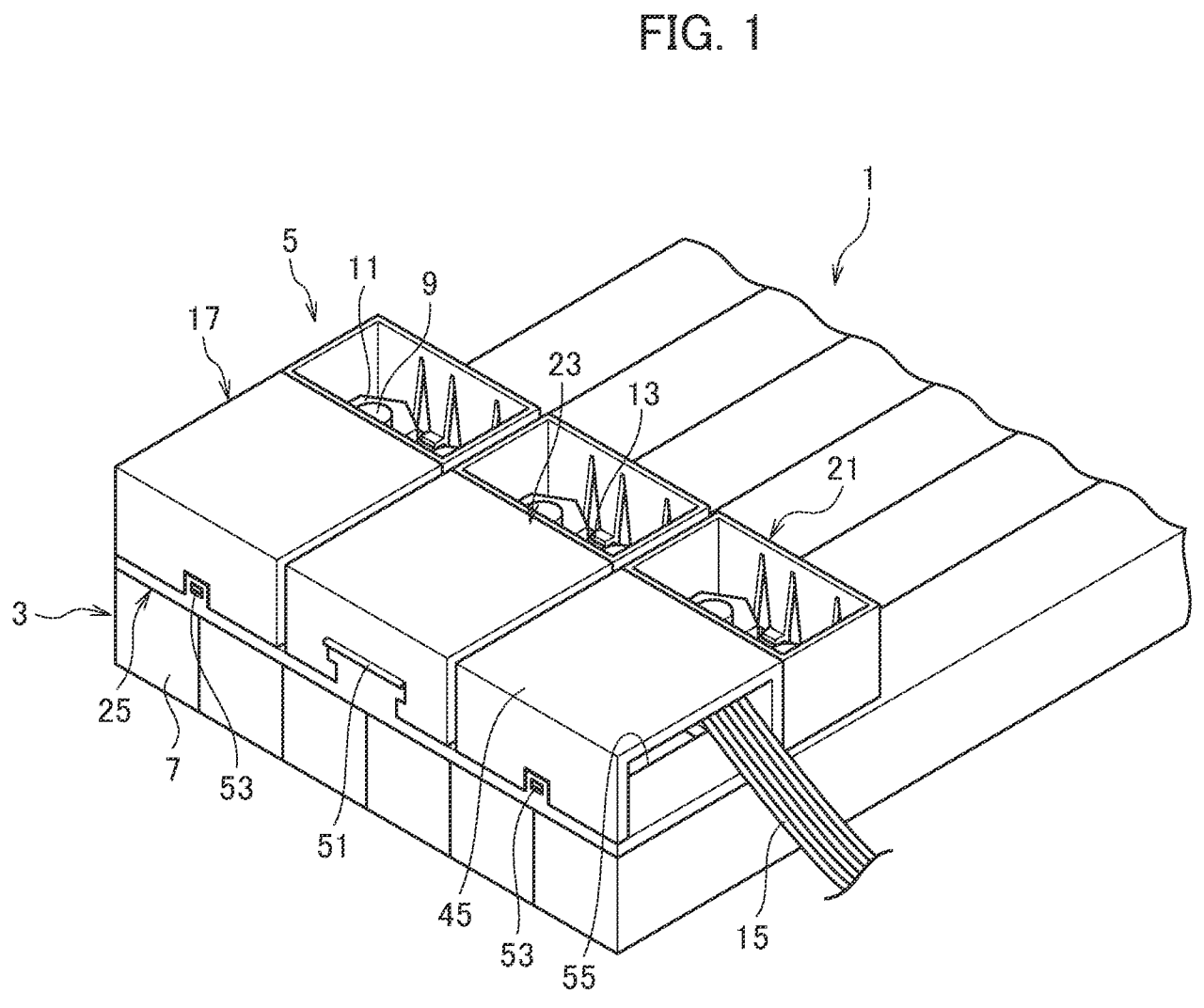

FIG. 1 is a perspective view of a power supply device according to an embodiment.

DETAILED DESCRIPTION OF THE INVENTION

Figure 2:
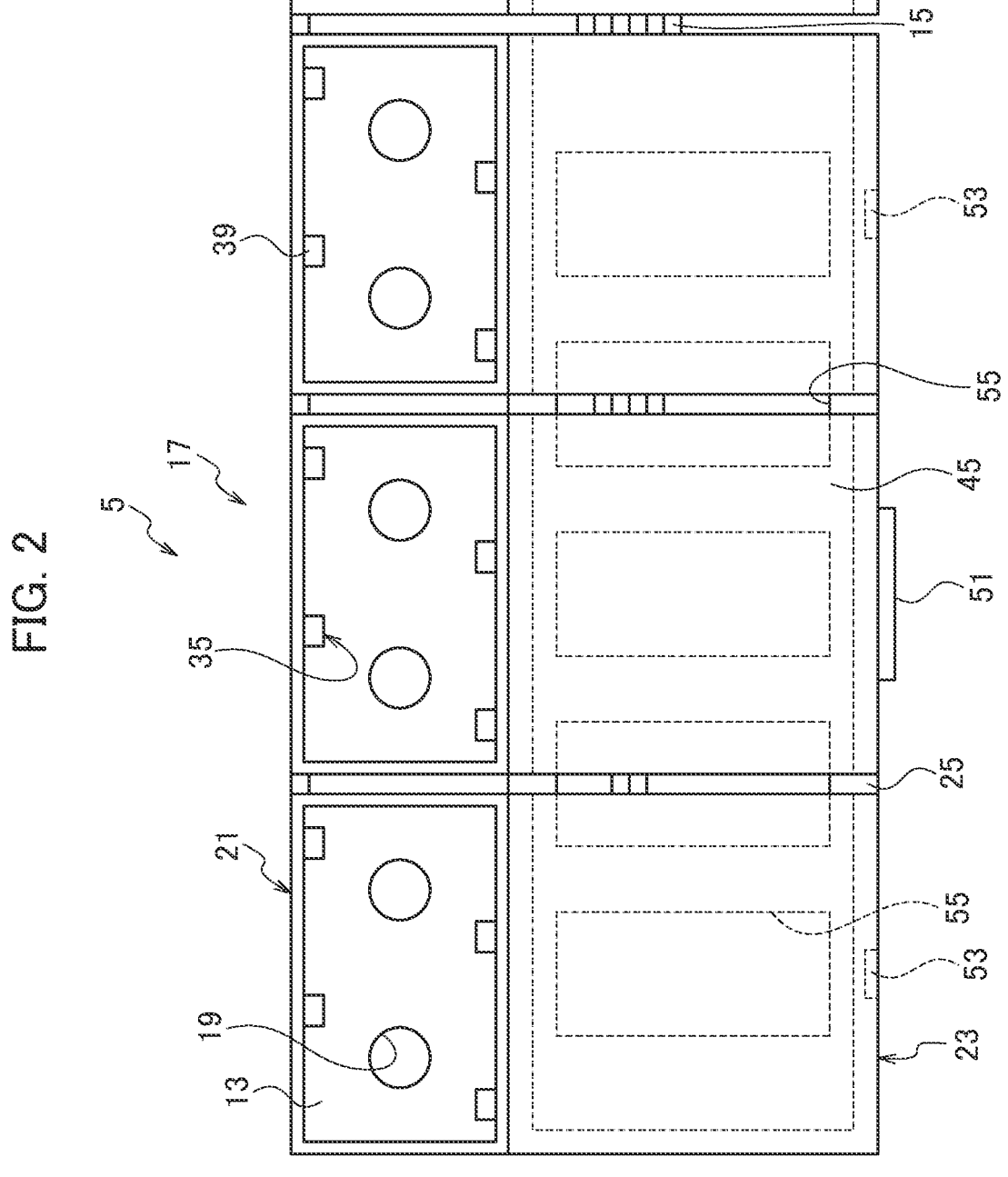
FIG. 2 is a bottom view of a bus bar module of the power supply device according to the embodiment.
Figure 3:
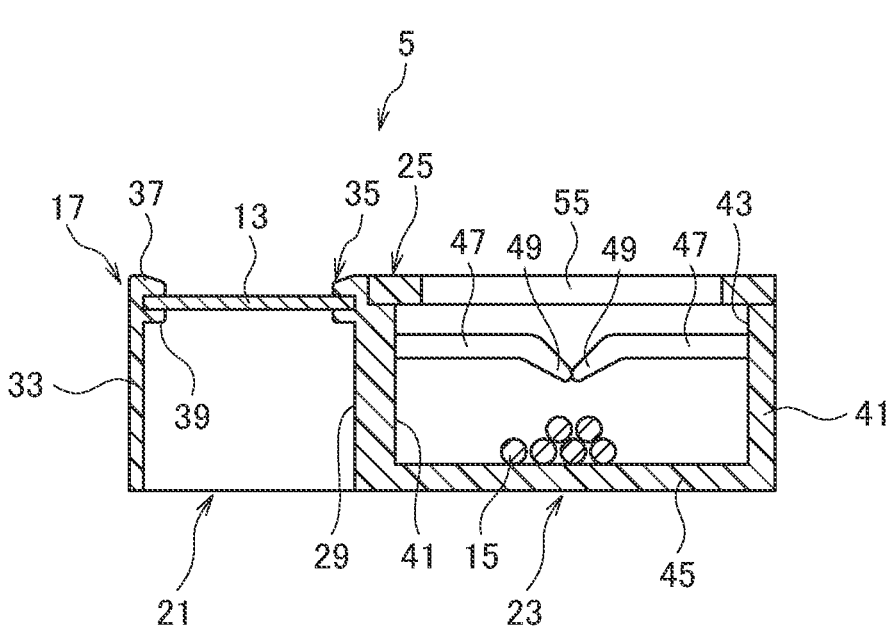
FIG. 3 is a cross-sectional view when a lid side of the bus bar module of the power supply device according to the embodiment is arranged above.

Hereinafter, a power supply device according to an embodiment will be described in detail with reference to the drawings. Note that dimensional ratios in the drawings are exaggerated for convenience of description and may be different from actual ratios.

As illustrated in FIGS. 1 to 7, a power supply device 1 according to an embodiment of the present invention is used as a power supply of a vehicle such as an electric vehicle or a hybrid vehicle. The power supply device 1 includes a battery cell assembly 3 and a bus bar module 5, and is loaded on the vehicle in a state where the battery cell assembly 3 and the bus bar module 5 are mounted.

The battery cell assembly 3 is configured by, for example, combining a plurality of battery cells 7 including chargeable and dischargeable secondary batteries. In the battery cell 7, an electrode element (not illustrated) is accommodated in a main body formed in a rectangular parallelepiped shape. On one side of the battery cell 7 in a height direction, positive and negative electrodes 9 electrically connected to the electrode element are formed to protrude outward. The outer periphery of the electrode 9 of the battery cell 7 is formed in a screw shape so that a nut 11 can be fastened. The plurality of battery cells 7 is alternately arranged such that, for example, the positive and negative electrodes 9 of adjacent battery cells 7 are different from each other.

The bus bar module 5 is mounted to the battery cell assembly 3, for example, in order to detect the voltage of each battery cell 7 in the battery cell assembly 3 and electrically connect the plurality of battery cells 7. The bus bar module 5 includes a bus bar 13, an electric wire 15, and an electric wire wiring body 17.

The bus bar 13 is made of a conductive material, and is formed in a rectangular plate shape to be capable of being arranged across two battery cells 7. A plurality of bus bars 13 is provided for the plurality of battery cells 7 such that each bus bar is arranged across two battery cells 7. In the bus bar 13, two insertion holes 19 through which the electrodes 9 of the battery cells 7 can be inserted are formed through the bus bar 13. The bus bar 13 is arranged on the electrode 9 of the battery cell 7, is electrically connected to the battery cell 7 by fastening the nut 11 to the electrode 9 inserting through the insertion hole 19, and electrically connects adjacent battery cells 7.

The electric wire 15 is, for example, a sheathed electric wire in which an outer periphery of a core wire made of a conductive material is sheathed with an insulating sheath. One end of the electric wire 15 is electrically connected to, for example, a terminal (not illustrated) electrically connected to the electrode 9 of the battery cell 7. The terminal is fastened together to the bus bar 13 and the electrode 9 with the nut 11 fastened to the electrode 9. Therefore, the bus bar 13 is electrically connected to the electric wire 15 via the terminal. The other end of the electric wire 15 is electrically connected to, for example, a connector (not illustrated) electrically connectable to a control unit (not illustrated) which controls the operation of the power supply device 1 arranged outside the power supply device 1. The electric wire 15 is electrically connected to the battery cell 7 to detect the voltage of the battery cell 7. Note that the bus bar 13 and the electric wire 15 may be electrically connected by directly connecting one end of the electric wire 15 to the bus bar 13.

The electric wire wiring body 17 is made of, for example, an insulating material such as a synthetic resin. The electric wire wiring body 17 includes a bus bar chamber 21, an electric wire wiring portion 23, and a lid 25.

A plurality of the bus bar chambers 21 is formed in an accommodating shape to be capable of accommodating one bus bar 13. Adjacent bus bar chambers 21 are connected via a connecting portion 27 elastically deformable in an arrangement direction. By connecting the plurality of bus bar chambers 21 via the elastically deformable connecting portion 27, it is possible to absorb a tolerance of the plurality of battery cells 7 with respect to the electrode 9. Both sides of the bus bar chamber 21 in the height direction are opened. The bus bar chamber 21 is arranged in a portion where the electrode 9 of the battery cell 7 is positioned in a state where the electric wire wiring body 17 is arranged on the battery cell assembly 3. A thin portion 31 formed to be thinner than other portions is provided on a side wall 29 of the bus bar chamber 21 at an opposite side to the electric wire wiring portion 23, and the side wall 29 is elastically deformable. In addition, weight can be reduced by providing the thin portion 31. Elastic pieces 33 which are elastically deformable are provided on both sides of the side wall 29 provided with the thin portion 31.

Such a bus bar chamber 21 is provided with a locking portion 35 for locking the bus bar 13. The locking portion 35 includes a locking protrusion 37 and a sandwiching protrusion 39. The locking protrusion 37 is provided on a free end side of the elastic piece 33 and the side wall 29 on the electric wire wiring portion 23 side arranged at a position point-symmetric of the elastic piece 33 with respect to the center of the insertion hole 19, and protrudes toward the inside of the bus bar chamber 21. The sandwiching protrusion 39 is provided at a position corresponding to the locking protrusion 37 to be separated from the locking protrusion 37 in the height direction of the bus bar chamber 21, and protrudes toward the inside of the bus bar chamber 21. A portion between the locking protrusion 37 and the sandwiching protrusion 39 is set to be equal to the thickness of the bus bar 13.

In such a locking portion 35, the elastic piece 33 is elastically deformed by inserting the bus bar 13 into the bus bar chamber 21 from the free end side of the elastic piece 33. When the bus bar 13 is positioned between the locking protrusion 37 and the sandwiching protrusion 39, the elastic piece 33 is restored from the elastic deformation, and the bus bar 13 is engaged to be sandwiched between the locking protrusion 37 and the sandwiching protrusion 39. When the locking protrusion 37 and the sandwiching protrusion 39 are engaged with the bus bar 13, the bus bar 13 is locked to the bus bar chamber 21 by the locking portion 35. Such an operation of accommodating the bus bar 13 in the bus bar chamber 21 is performed in a state where a surface on the lid 25 side in the electric wire wiring body 17 before being mounted to the battery cell assembly 3 is directed upward.

A plurality of the electric wire wiring portion 23 is provided to correspond to the plurality of bus bar chambers 21 such that the side wall 41 on the bus bar chamber 21 side is provided integrally with the bus bar chamber 21. The electric wire wiring portion 23 is formed in an accommodating shape such that the opening 43 is provided on one side in the height direction, the bottom wall 45 is provided on the other side in the height direction and is closed, and the side wall 41 extends toward the opening 43 side from both sides of the bottom wall 45 in a width direction. Adjacent electric wire wiring portions 23 are provided with no partition wall and communicate with each other. The side wall 41 of the electric wire wiring portion 23 on the bus bar chamber 21 side is provided with a communication hole (not illustrated) which communicates with the bus bar chamber 21 and is arranged with a part of the terminal electrically connected to the battery cell 7. In the electric wire wiring portion 23, a plurality of electric wires 15 having one end electrically connected to each of the plurality of battery cells 7 is accommodated.

Such an electric wire wiring portion 23 is provided with a pair of retaining pieces 47 which prevents the electric wire 15 from lifting up from the opening 43. The pair of retaining pieces 47 is provided in at least one electric wire wiring portion 23 of the plurality of electric wire wiring portions 23. Note that the pair of retaining pieces 47 may be provided in each of the plurality of electric wire wiring portions 23. The pair of retaining pieces 47 extends from the side wall 41 of the electric wire wiring portion 23 in a direction of approaching each other. The pair of retaining pieces 47 is provided to be elastically deformable so that the side wall 41 side of the electric wire wiring portion 23 serves as a base end and distal ends 49 close to each other serve as free ends. The distal ends 49 of the pair of retaining pieces 47 are bent toward the bottom wall 45 side opposite to the opening 43 of the electric wire wiring portion 23.

Such a pair of retaining pieces 47 is elastically deformed when the electric wire 15 is inserted into the electric wire wiring portion 23 from the opening 43 and the electric wire 15 passes between the distal ends 49. At this time, the distal end 49 is bent toward the bottom wall 45, and thus the electric wire 15 is easily inserted between the distal ends 49. The pair of retaining pieces 47 is restored from elastic deformation when the electric wire 15 passes between the distal ends 49. In a state where the pair of retaining pieces 47 is restored, the distal end 49 is arranged close to each other, and the movement of the electric wire 15 toward the opening 43 side of the electric wire wiring portion 23 can be restricted by the pair of retaining pieces 47. Therefore, the pair of retaining pieces 47 can prevent the electric wire 15 from lifting up from the opening 43 of the electric wire wiring portion 23. At this time, the distal end 49 is bent toward the bottom wall 45, thus it is difficult for the electric wire 15 to enter between the distal ends 49, and it is possible to suppress the electric wire 15 from coming off between the distal ends 49. Such an operation of wiring the electric wires 15 in the electric wire wiring portion 23 is performed in a state where a surface on the opening 43 side in the electric wire wiring body 17 before being mounted to the battery cell assembly 3 is directed upward.

Figure 4:
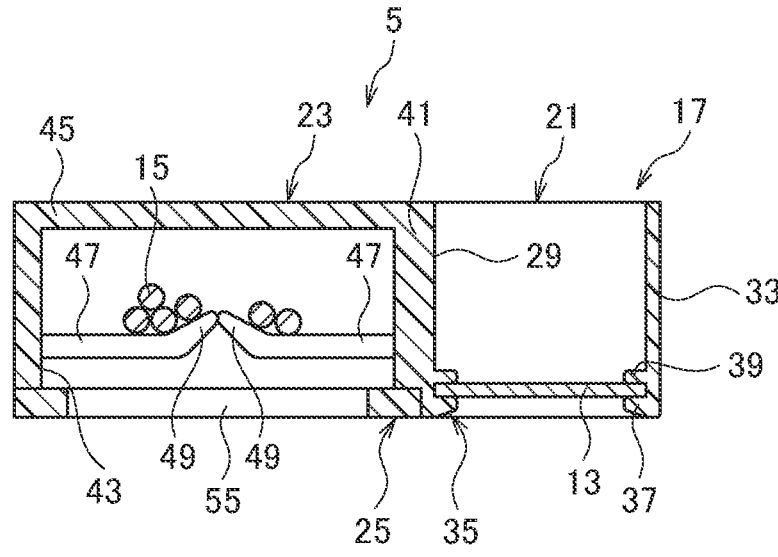
FIG. 4 is a cross-sectional view when the lid side of the bus bar module of the power supply device according to the embodiment is arranged below.
Figure 5:
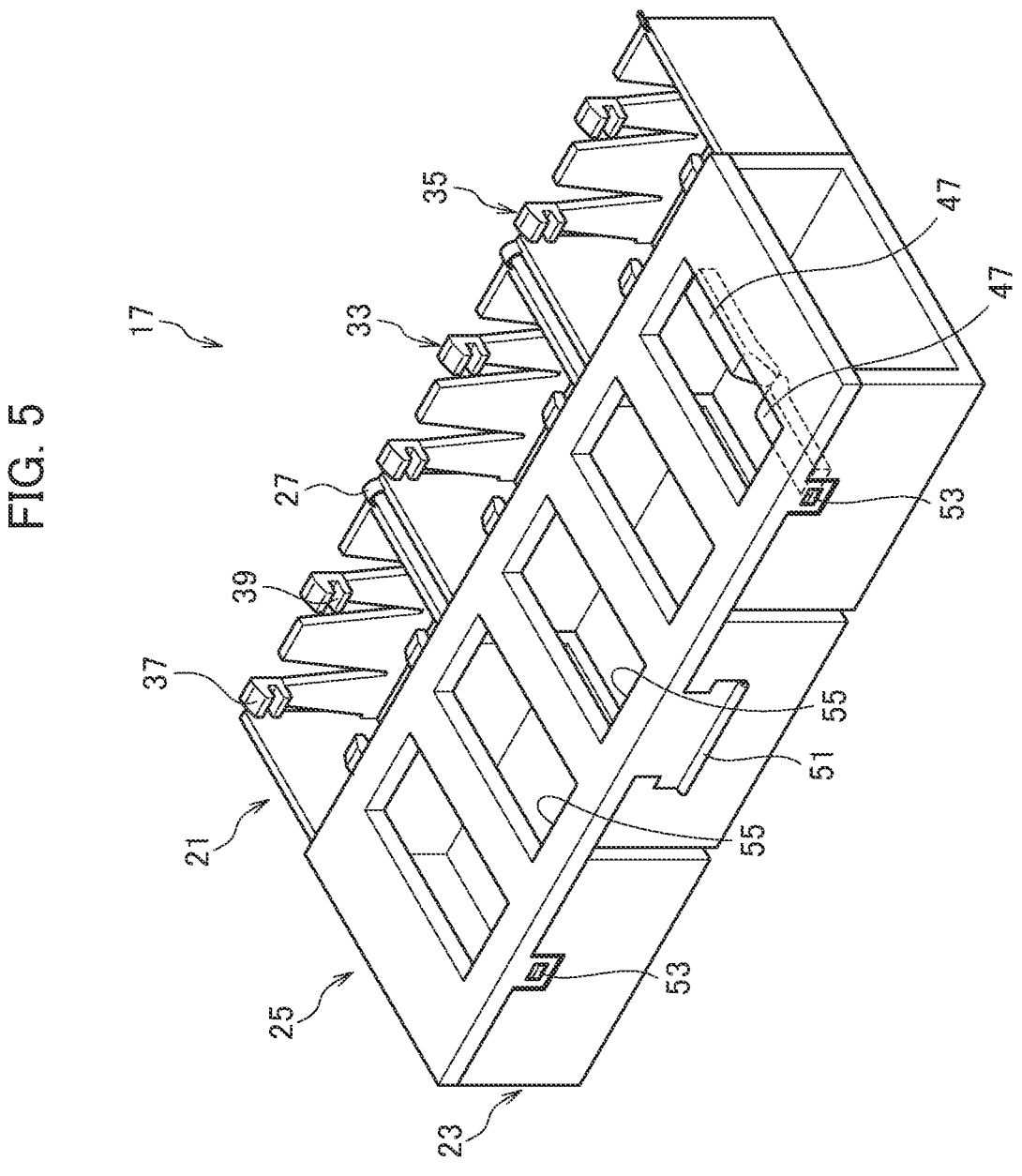
FIG. 5 is a perspective view of an electric wire wiring body of the power supply device according to the embodiment.
Figure 6:
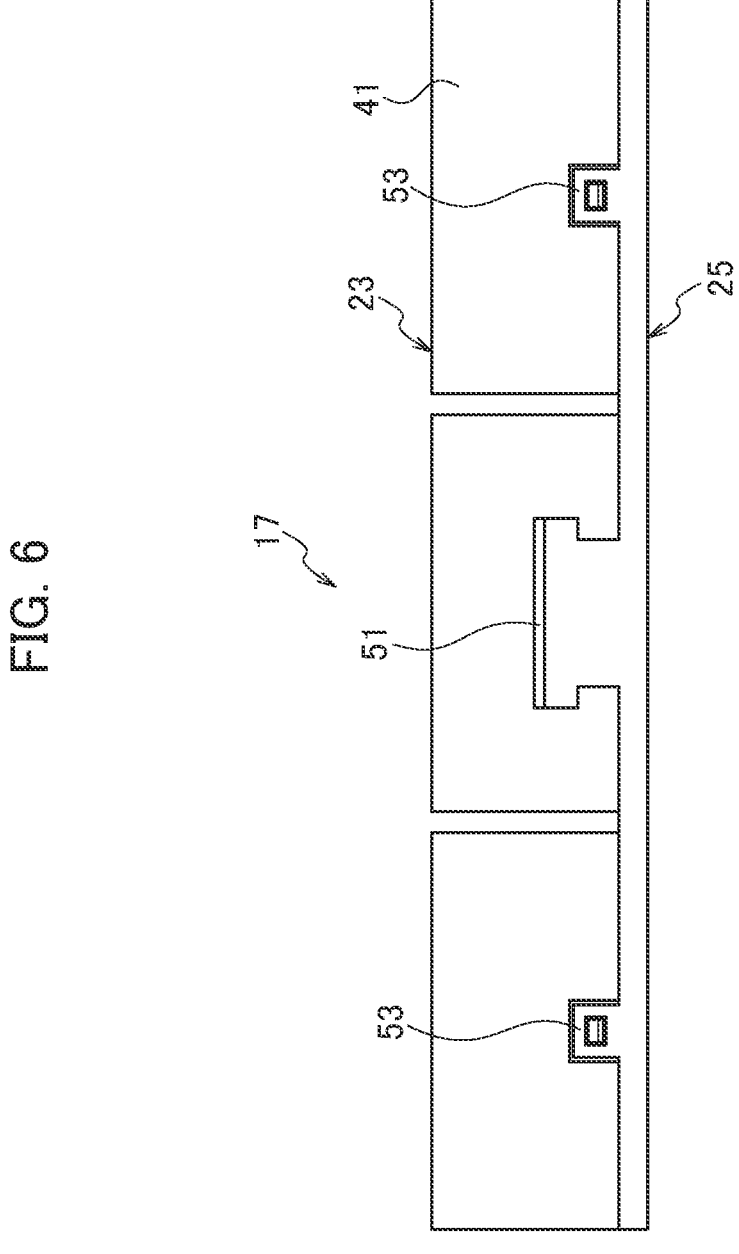
FIG. 6 is a side view of the electric wire wiring body of the power supply device according to the embodiment as viewed from an outside of an electric wire wiring portion.
Figure 7:
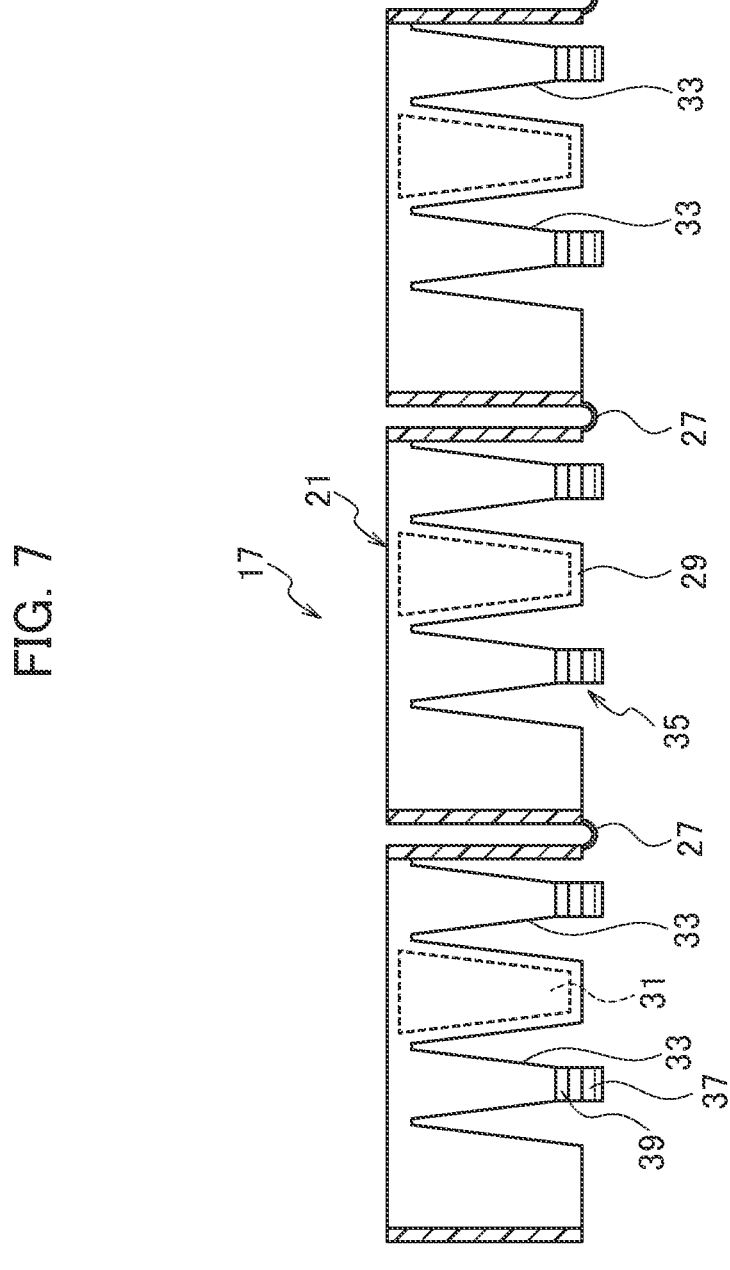
FIG. 7 is a side view of the electric wire wiring body of the power supply device according to the embodiment as viewed from an inside of a bus bar chamber.

Here, the electric wire wiring body 17 is mounted such that the opening 43 side of the electric wire wiring portion 23 faces the battery cell assembly 3. Therefore, as illustrated in FIG. 4, the bottom wall 45 of the electric wire wiring portion 23 is arranged on the opposite side of the battery cell assembly 3. At this time, the distal ends 49 of the pair of retaining pieces 47 are bent toward the bottom wall 45, thus it is difficult for the electric wire 15 to reach between the distal ends 49, and it is possible to suppress the electric wire 15 from coming off between the distal ends 49.

The lid 25 is formed in a rectangular plate shape to be able to collectively close the openings 43 of three electric wire wiring portions 23. The lid 25 is provided to be openable and closable with respect to the opening 43 of the electric wire wiring portion 23 via a hinge 51 formed in a thin shape as a member continuous with the central electric wire wiring portion 23. On both sides of the hinge 51 of the lid 25, frame-shaped engaging portions 53 engageable with protruding engaged portions provided in two electric wire wiring portions 23 are provided respectively. The engaging portion 53 is engaged with the engaged portion of the electric wire wiring portion 23, thereby preventing the lid 25 from floating from the opening 43 on the hinge 51 side. On the opposite side of the portion where the hinge 51 is positioned in the width direction of the lid 25, a frame-shaped lock portion (not illustrated) engageable with a protruding locked portion (not illustrated) provided in the central electric wire wiring portion 23 is provided. The lock portion is engaged with the locked portion of the electric wire wiring portion 23 to hold a state where the lid 25 closes the opening 43 of the electric wire wiring portion 23.

Such a lid 25 is arranged above the electric wire wiring body 17 before being mounted to the battery cell assembly 3. The lid 25 arranged above is opened via the hinge 51 to open the opening 43 of the electric wire wiring portion 23. The plurality of electric wires 15 are wired in the electric wire wiring portion 23 in which the opening 43 is opened. The opening 43 of the electric wire wiring portion 23 is closed by closing the lid 25 via the hinge 51 with respect to the electric wire wiring portion 23 in which the plurality of electric wires 15 are wired.

The lid 25 which closes the opening 43 of the electric wire wiring portion 23 is provided with a plurality of opening portions 55 formed to penetrate the lid 25. The plurality of opening portions 55 are arranged such that the inside of each of the plurality of electric wire wiring portions 23 can be visually recognized. The opening portion 55 is opened in a rectangular shape slightly smaller than the width of the electric wire wiring portion 23. By providing the opening portion 55 in the lid 25, even in a state where the lid 25 closes the opening 43 of the electric wire wiring portion 23, the wiring state of the electric wire 15 with respect to the electric wire wiring portion 23 can be visually recognized. In addition, weight can be reduced by providing the plurality of opening portions 55 in the lid 25.

Here, when the bus bar module 5 is mounted such that the bottom wall 45 side of the electric wire wiring portion 23 faces the battery cell assembly 3, the lid 25 having the opening portion 55 is exposed to the outside. Therefore, there is a possibility that the electric wire 15 and the peripheral member interfere with each other via the opening portion 55.

In this regard, the bus bar module 5 is mounted to the battery cell assembly 3 such that lid 25 faces the battery cell assembly 3. In a state where the bus bar module 5 is mounted to the battery cell assembly 3, the opening portion 55 of the lid 25 is closed by the battery cell assembly 3, and the outer surface of the bottom wall 45 of the electric wire wiring portion 23 is exposed to the outside. Therefore, in the power supply device 1, there is not a large opening that allows the electric wire 15 to be exposed to the outside, and it is possible to prevent the interference between the electric wire 15 and the peripheral member. Note that even when the lid 25 side of the bus bar module 5 faces downward, the pair of retaining pieces 47 and the portion defining the plurality of opening portions 55 prevent the plurality of electric wires 15 from falling off from the electric wire wiring portion 23.

Here, the bus bar module 5 is fixed to the battery cell assembly 3 by fastening the nut 11 to the electrode 9 of the battery cell 7 which is inserted through the insertion hole 19 of the bus bar 13. The locking portion 35 for locking the bus bar 13 to the bus bar chamber 21 is arranged closer to the lid 25 side than the bottom wall 45 in the height direction of the bus bar chamber 21. In other words, the locking portion 35 is arranged at a position close to the battery cell assembly 3 in a state where the bus bar module 5 is mounted to the battery cell assembly 3. Therefore, in a state where the bus bar module 5 is mounted to the battery cell assembly 3, the bus bar 13 is arranged at a position close to the battery cell assembly 3, and the bus bar module 5 can be stably fixed to the battery cell assembly 3. In addition, the bus bar 13 and the electrode 9 of the battery cell 7 can be arranged close to each other, and electrical connection reliability can be maintained.

By arranging the locking portion 35 on the lid 25 side, the locking portion 35 is arranged on the opening 43 side of the electric wire wiring portion 23. Therefore, in a state before the bus bar module 5 is mounted to the battery cell assembly 3, the operation of accommodating the bus bar 13 in the bus bar chamber 21 can be easily performed similarly to the operation of wiring the electric wires 15 in the electric wire wiring portion 23. Therefore, by arranging the locking portion 35 on the lid 25 side, the mountability of the bus bar module 5 can be improved.

Such a power supply device 1 includes the battery cell assembly 3 having the plurality of battery cells 7 and the bus bar module 5 mounted to the battery cell assembly 3. In addition, the bus bar module 5 includes the bus bar 13, the electric wire 15, and the electric wire wiring body 17. Furthermore, the electric wire wiring body 17 includes the bus bar chamber 21 which accommodates the bus bar 13 therein, the electric wire wiring portion 23 which has one side opened and the other side closed and accommodates the electric wire 15 therein, and the lid 25 which is arranged in the opening 43 of the electric wire wiring portion 23. In addition, the opening portion 55 through which the electric wire 15 accommodated in the electric wire wiring portion 23 can be visually recognized is formed in the lid 25. Then, the bus bar module 5 is mounted to the battery cell assembly 3 such that the lid 25 faces the battery cell assembly 3.

Since the opening portion 55 through which the electric wires 15 accommodated in the electric wire wiring portion 23 can be visually recognized is formed in the lid 25, even when the lid 25 closes the opening 43 of the electric wire wiring portion 23, the wiring state of the electric wires 15 with respect to the electric wire wiring portion 23 can be visually recognized. Since the bus bar module 5 is mounted to the battery cell assembly 3 such that the lid 25 faces the battery cell assembly 3, the opening portion 55 of the lid 25 is not exposed to the outside. Therefore, in a state where the bus bar module 5 is mounted to the battery cell assembly 3, there is not a large opening that allows the electric wire 15 to be exposed to the outside, and it is possible to prevent the interference between the electric wire 15 and the peripheral member.

Therefore, in such a power supply device 1, the wiring state of the electric wire 15 with respect to the electric wire wiring portion 23 can be visually recognized, and the electric wire 15 can be protected.

The bus bar chamber 21 is provided with the locking portion 35 for locking the bus bar 13 on the lid 25 side. Therefore, in a state where the bus bar module 5 is mounted to the battery cell assembly 3, the bus bar 13 and the electrode 9 of the battery cell 7 can be arranged close to each other, and electrical connection reliability can be maintained. In addition, by arranging the locking portion 35 on the lid 25 side, the locking portion 35 is arranged on the opening 43 side of the electric wire wiring portion 23. Therefore, in a state before the bus bar module 5 is mounted to the battery cell assembly 3, the operation of accommodating the bus bar 13 in the bus bar chamber 21 can be easily performed similarly to the operation of wiring the electric wires 15 in the electric wire wiring portion 23. Therefore, the operation of mounting the electric wire 15 and the bus bar 13 with respect to the electric wire wiring body 17 can be easily performed, and the mountability of the bus bar module 5 can be improved.

In the electric wire wiring portion 23, the pair of retaining pieces 47 of which the distal ends 49 are arranged close to each other and which restricts the movement of the electric wire 15 toward the opening 43 of the electric wire wiring portion 23 is provided to be elastically deformable. Then, the distal ends 49 of the pair of retaining pieces 47 are bent toward the opposite side of the opening 43 of the electric wire wiring portion 23.

Therefore, the pair of retaining pieces 47 can prevent the electric wire 15 from being detached from the opening 43 of the electric wire wiring portion 23. Since the distal ends 49 of the pair of retaining pieces 47 are bent toward the opposite side of the opening 43 of the electric wire wiring portion 23, the electric wire 15 can be guided between the distal ends 49 when the electric wire 15 is wired in the electric wire wiring portion 23. On the other hand, in a state where the electric wire 15 is wired in the electric wire wiring portion 23, the electric wire 15 is less likely to reach between the distal ends 49, and it is possible to suppress the electric wire 15 from coming off between the distal ends 49.

For example, in the present embodiment, the lid 25 is connected to three electric wire wiring portions 23 via one hinge 51, but the present invention is not limited thereto, and the lid 25 may be connected to all the electric wire wiring portions 23 via the hinge 51. In addition, the lid 25 may be provided separately from the electric wire wiring portion 23 without being connected to the electric wire wiring portion 23 via the hinge 51. In addition, one lid 25 may be provided for one electric wire wiring portion 23.

Although the bus bar chamber 21 and the electric wire wiring portion 23 are divided into a plurality of parts, the present invention is not limited thereto, and the bus bar chamber 21 and the electric wire wiring portion 23 may be formed of a continuous member. In this case, for example, it is sufficient if the bus bar chamber 21 is divided into a plurality of portions by a partition wall or the like to be able to accommodate the plurality of bus bars 13. It is sufficient if the electric wire wiring portion 23 is formed in a gutter shape to communicate in the length direction of the electric wire 15.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A power supply device comprising:
   a battery cell assembly including battery cells; and
   a bus bar module mounted to the battery cell assembly, wherein
   the bus bar module includes a bus bar, an electric wire, and an electric wire wiring body,
   the electric wire wiring body includes:
     a bus bar chamber configured to accommodate the bus bar therein;
     an electric wire wiring portion having a first side opened with an opening and a second side closed, the electric wire wiring portion configured to accommodate the electric wire therein; and
     a lid arranged at the opening of the electric wire wiring portion,
   the lid has an opening portion through which the electric wire accommodated in the electric wire wiring portion is visible, and
   the bus bar module is mounted to the battery cell assembly with the lid facing the battery cell assembly and the second side of the electric wire wiring portion facing opposite the battery cell assembly.

2. The power supply device according to claim 1, wherein the bus bar chamber includes a locking portion configured to lock the bus bar on the lid side.

3. The power supply device according to claim 1, wherein the electric wire wiring portion has a pair of retaining pieces which are elastically deformable, have distal ends arranged close to each other, and restrict the electric wire from moving toward the opening of the electric wire wiring portion, and
   the distal ends of the pair of retaining pieces are bent toward an opposite side of the opening of the electric wire wiring portion.

4. The power supply device according to claim 1, wherein the bus bar module is mounted to the battery cell assembly such that the opening portion of the lid is closed by the battery cell assembly.

5. The power supply device according to claim 1, wherein the first side of the electric wire wiring portion and the second side of the electric wire wiring portion are opposite sides of the electric wire wiring portion with respect to a direction in which the bus bar module is mounted on the battery cell assembly.

\* \* \* \* \*